US008611647B2

(12) United States Patent
Kataoka

(10) Patent No.: US 8,611,647 B2
(45) Date of Patent: Dec. 17, 2013

(54) METHOD FOR GENERATING BACKGROUND IMAGE AND SYSTEM FOR GENERATING BACKGROUND IMAGE

(75) Inventor: Kouji Kataoka, Tokyo (JP)

(73) Assignee: M. Soft Co., Ltd., Tokyo (JP)

( * ) Notice: Subject to any disclaimer, the term of this patent is extended or adjusted under 35 U.S.C. 154(b) by 128 days.

(21) Appl. No.: 12/374,498

(22) PCT Filed: Aug. 11, 2008

(86) PCT No.: PCT/JP2008/002192
§ 371 (c)(1),
(2), (4) Date: Apr. 8, 2011

(87) PCT Pub. No.: WO2010/018610
PCT Pub. Date: Feb. 18, 2010

(65) Prior Publication Data
US 2011/0176727 A1    Jul. 21, 2011

(51) Int. Cl.
*G06K 9/00* (2006.01)
(52) U.S. Cl.
USPC ............................ 382/164; 382/162; 382/172
(58) Field of Classification Search
USPC .................................. 382/162, 164, 168–173
See application file for complete search history.

(56) References Cited

U.S. PATENT DOCUMENTS 7,181,081 B2 *   2/2007  Sandrew ........................ 382/254
8,041,116 B2 *  10/2011  Eaton et al. .................... 382/173
8,064,695 B2 *  11/2011  Eaton et al. .................... 382/173
8,094,943 B2 *   1/2012  Eaton et al. .................... 382/190
2007/0269135 A1 * 11/2007  Ono ................................ 382/276

FOREIGN PATENT DOCUMENTS

| JP | 63194477 A   | 8/1988  |
| JP | 05336539 A   | 12/1993 |
| JP | 9149364 A    | 6/1997  |
| JP | 2003230045 A | 8/2003  |
| JP | 2007089111 A | 4/2007  |
| JP | 2008141698 A | 6/2008  |

OTHER PUBLICATIONS

English translation of Japanese Patent Application JP9-149364, published Jun. 6, 1997.*
English translation of Japanese Patent Application JP 63-194477, published Aug. 11, 1988.*

* cited by examiner

*Primary Examiner* — Li Liu
(74) *Attorney, Agent, or Firm* — Porzio, Bromberg & Newman, P.C.

(57) ABSTRACT

An unprocessed image is prepared which is shot against an arbitrary background, including materials to be trimmed. Color values are collected from a plurality of frames of this unprocessed image in a collection point including one or more pixels, whereby a color information set is obtained. From the color information set, it is judged which color shows the background and which color shows the materials to be trimmed, thereby determining an optimum background-side color value. This process is applied to an area where to extract the background from, thereby obtaining a background image into which the background is extracted. This makes it possible to obtain background images from unprocessed images that are shot in busy locations, without traffic controls or dedicated studios.

22 Claims, 11 Drawing Sheets

(A)

(B)

METHOD FOR GENERATING BACKGROUND IMAGE AND SYSTEM FOR GENERATING BACKGROUND IMAGE

CROSS REFERENCE TO RELATED APPLICATION

This is a National Stage of International Application PCT/W2008/002192, filed 11 Aug. 2008, the disclosure of which Application is incorporated by reference herein.

TECHNICAL FIELD

The present invention relates to a technology for erasing subjects unnecessary for a video work from an unprocessed image of the same in which the unnecessary subjects show up, thereby generating an image into which the background is extracted.

BACKGROUND ART

Video works can be shot by studio shooting which is performed in dedicated film studios and the like, or by location shooting which is performed at locations other than at dedicated film studios, including outdoor locations such as in a park or at a station or the like. For studio shooting, film sets tailored to the works are built in the studios so that it is possible to shoot only what is necessary for the works. Furthermore, film studios are only accessible to authorized persons, being closed to outsiders. The shooting subjects can also be elaborated on freely so that images can be shot as imagined.

Location shooting is performed outdoors where cars and people can enter and leave freely, so that the video works obtained may contain unnecessary subjects. To avoid this, the shooting is usually performed in the early morning hours or while measures such as traffic control are in place.

DISCLOSURE OF THE INVENTION

Problems to be Solved by the Invention

Location shooting, however, often takes place in famous locations such as Tokyo station, Kabuki-Cho, and the intersection in front of Shibuya station, where traffic controls are difficult to enforce and the flows of cars and people may not cease, even early in the morning. As a result, people, cars, and the like often come into sight even if buildings and streets alone are to be shot. To enforce traffic control requires the complicated procedure of in-advance applications to administrative authorities, aside from the problem of limited shooting hours. In addition, the shooting may be hindered by onlookers gathering to watch.

When using a film studio, however, it is often necessary to reserve a large studio and build a set in the studio so as to duplicate buildings and streets, requiring enormous costs. There is also a problem of limited shooting areas since all the actual buildings and streets cannot be built in a set. With a film set, no matter how elaborate, the image remains somewhat unnatural because it is impossible to duplicate the real thing perfectly.

Other techniques presently available include creating images in which the real thing is replicated by means of computer graphics and the like. When compared to the real things, however, the images created by computer graphics and the like inevitably look unnatural, and this results in a loss of quality of the work.

The present invention has been achieved in view of the foregoing problems. It is thus an object of the present invention to provide a method for generating a background image and a system for generating a background image, both of which erase originally unnecessary materials intended to be trimmed from an unprocessed image in which such materials to be trimmed appear, to extract only buildings, streets, and other background portions for use in a work, and also expose the background that has been hidden behind the unnecessary materials in the erased areas of the image, thereby generating an image that contains the background alone.

Means for Solving the Problems

To achieve the foregoing object, the present invention provides a method for generating a background image, comprising: a preparation step of preparing an unprocessed image which is shot against an arbitrary background, including a material to be trimmed; a color information collection step of collecting color values from a plurality of frames of the unprocessed image at a collection point composed of one or more pixels, thereby obtaining a color information set; and a color setting step of judging from the color information set which color shows the background and which color shows the material to be trimmed, and determining an optimum background-side color value, the method being characterized in that the color information collection step and the color setting step are applied to an area where to extract the background from, thereby obtaining a background image into which the background is extracted.

To achieve the foregoing object, the method for generating a background image according to the foregoing invention is characterized in that the collection point is composed of a plurality of pixels including one certain pixel and an adjacent pixel adjoining to the one certain pixel.

To achieve the foregoing object, the method for generating a background image according to the foregoing invention is characterized in that the color information collection step includes selecting a plurality of frames from all frames of the unprocessed image at predetermined intervals, and obtaining the color information set therefrom.

To achieve the foregoing object, the method for generating a background image according to the foregoing invention is characterized by returning to the color information collection step to acquire the color information set again from an increased number of frames when the background-side color value is indeterminable in the color setting step.

To achieve the foregoing object, the method for generating a background image according to the foregoing invention is characterized in that the color setting step includes determining the background-side color value based on a frequency of occurrence in a color spectrum of the color information set.

To achieve the foregoing object, the method for generating a background image according to the foregoing invention is characterized in that the color setting step includes determining a mode value of the color spectrum of the color information set as the background-side color value.

To achieve the foregoing object, the method for generating a background image according to the foregoing invention is characterized in that the color setting step includes preparing a judgment criterion in advance, and determining the background-side color value when the frequency of occurrence exceeds the judgment criterion.

To achieve the foregoing object, the method for generating a background image according to the foregoing invention is characterized in that the color setting step includes determining the background-side color value based on an average color value of the color information set.

To achieve the foregoing object, the method for generating a background image according to the foregoing invention is characterized in that the background image into which the background is extracted is obtained by setting a judgment threshold color value based on the background-side color value, and correcting the unprocessed image in a portion where the judgment threshold color value is exceeded.

To achieve the foregoing object, the method for generating a background image according to the foregoing invention is characterized in that the image is corrected in the portion where the judgment threshold color value is exceeded, by using color information on the unprocessed image near to immediately before timing when the judgment threshold color value is exceeded.

To achieve the foregoing object, the method for generating a background image according to the foregoing invention is characterized in that a judgment upper limit color value and a judgment lower limit color value are set as the judgment threshold color value, and the unprocessed image is corrected in a portion where the judgment upper limit value is exceeded or where the judgment lower limit value is not reached.

To achieve the foregoing object, the method for generating a background image according to the foregoing invention is characterized by comprising a marquee setting step of generating marquee information for determining the area where to extract the background from with respect to the unprocessed image.

To achieve the foregoing object, the present invention provides a system for generating a background image, comprising: preparation means for storing an unprocessed image into storing means, the unprocessed image being shot against an arbitrary background, including a material to be trimmed; color information collection means for collecting color values from a plurality of frames of the unprocessed image at a collection point composed of one or more pixels, thereby generating a color information set; and color setting means for judging from the color information set which color shows the background and which color shows the material to be trimmed, and determining an optimum background-side color value, the system being characterized in that the color information collection means and the color setting means determine the background-side color value on an area where to extract the background from, thereby obtaining a background image into which the background is extracted.

To achieve the foregoing object, the system for generating a background image according to the foregoing invention is characterized in that the collection point in the color information collection means is composed of a plurality of pixels including one certain pixel and an adjacent pixel adjoining to the one certain pixel.

To achieve the foregoing object, the system for generating a background image according to the foregoing invention is characterized in that the color information collection means selects a plurality of frames from all frames of the unprocessed image at predetermined intervals, and obtains the color information set therefrom.

To achieve the foregoing object, the system for generating a background image according to the foregoing invention is characterized in that the color information collection means acquires the color information set again from an increased number of frames when the background-side color value is indeterminable by the color setting means.

To achieve the foregoing object, the system for generating a background image according to the foregoing invention is characterized in that the color setting means determines the background-side color value based on a frequency of occurrence in a color spectrum of the color information set.

To achieve the foregoing object, the system for generating a background image according to the foregoing invention is characterized in that the color setting means determines a mode value of the color spectrum of the color information set as the background-side color value.

To achieve the foregoing object, the system for generating a background image according to the foregoing invention is characterized in that the color setting means prepares a judgment criterion in advance, and determines the background-side color value when the frequency of occurrence exceeds the judgment criterion.

To achieve the foregoing object, the system for generating a background image according to the foregoing invention is characterized in that the color setting means determines the background-side color value based on an average color value of the color information set.

To achieve the foregoing object, the system for generating a background image according to the foregoing invention is characterized by comprising correction operation means for setting a judgment threshold color value based on the background-side color value, and correcting the unprocessed image in a portion where the judgment threshold color value is exceeded, thereby obtaining the background image into which the background is extracted.

To achieve the foregoing object, the system for generating a background image according to the foregoing invention is characterized in that the correction operation means corrects the image in the portion where the judgment threshold color value is exceeded, by using color information on the unprocessed image near to immediately before timing when the judgment threshold color value is exceeded.

To achieve the foregoing object, the system for generating a background image according to the foregoing invention is characterized in that the correction operation means sets a judgment upper limit color value and a judgment lower limit color value as the judgment threshold color value, and corrects the unprocessed image in a portion where the judgment upper limit value is exceeded or where the judgment lower limit value is not reached.

To achieve the foregoing object, the system for generating a background image according to the foregoing invention is characterized by comprising marquee setting means for generating marquee information for determining the area where to extract the background from with respect to the unprocessed image.

Effect of the Invention

According to the video compositing method or the system for generating a background image of the present invention, it is possible to generate a natural background image having cars and people erased, even at locations with a ceaseless traffic.

BEST MODE FOR CARRYING OUT THE INVENTION

Hereinafter, an embodiment of the present invention will be described with reference to the drawings. It should be mentioned in advance that the present invention is not limited to these drawings.

Figure 1:
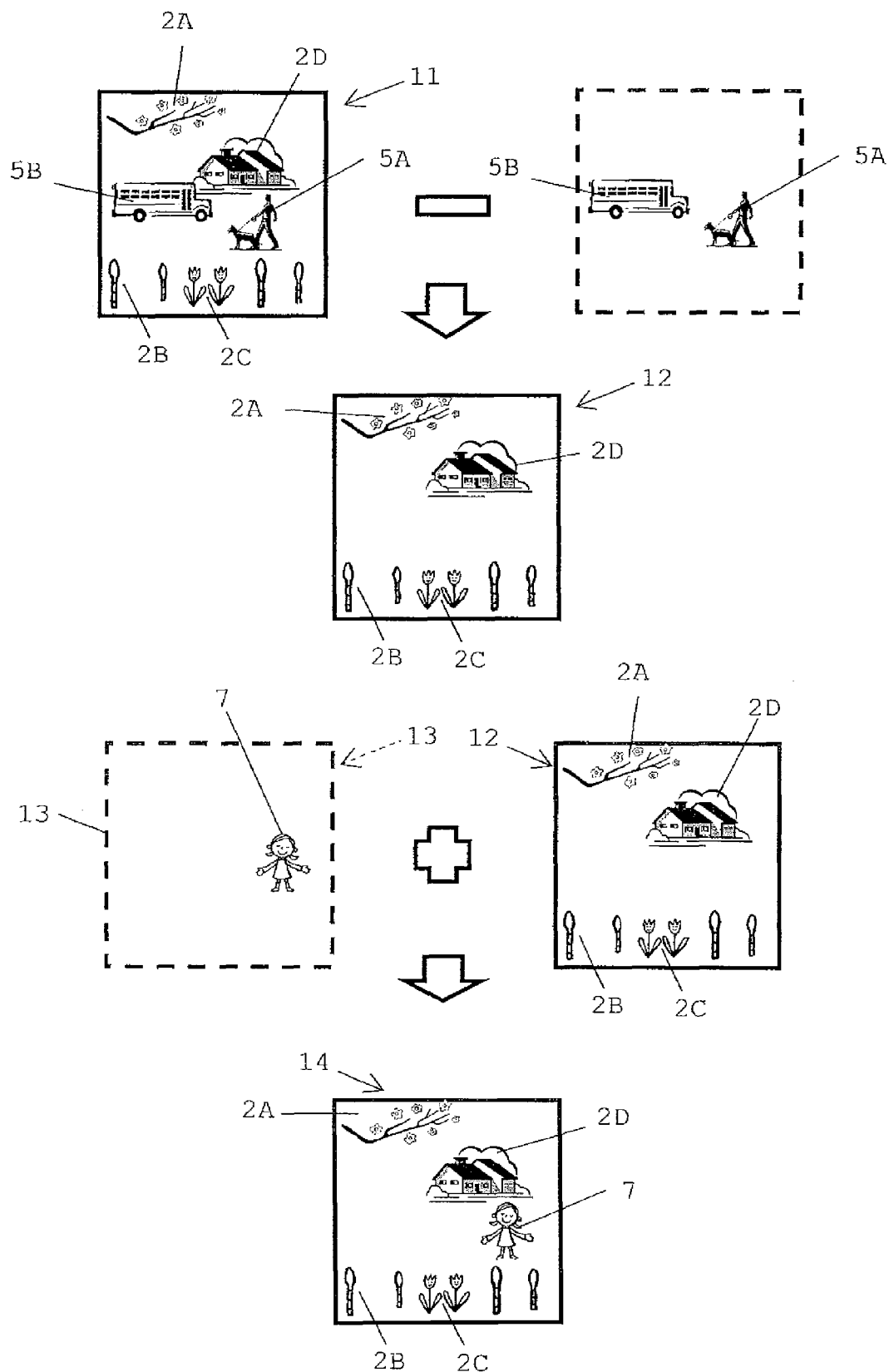
FIG. 1 is a diagram showing the concept of a background image generation method according to an embodiment of the present invention.

A description will initially be given of the comprehensive, basic concept of the present embodiment. In the present embodiment, as shown in FIG. 1, an image including a passenger 5A and a bus 5B, being the materials to be trimmed, are shot against a background to obtain an unprocessed image 11. The background of the unprocessed image 11 includes a plum tree 2A, horsetails 2B, tulips 2C, and houses 2D. As employed herein, a background refers to one having few motions.

In the present embodiment, the passenger 5A and the bus 5B, being the materials to be trimmed, are trimmed off this unprocessed image 11 to generate a background image 12. This background image 12 is composited with a composition image 13 in which a performer 7 such as an actor performs, thereby completing an intended final image 14. This compositing may use existing technologies.

It should be appreciated that this unprocessed image 11 is preferably shot for a relatively long duration. This shooting may be performed by using an ordinary camera that can be fixed with a stand. For proper extraction of the background image 12, the camera is preferably fixed for shooting, whereas an unprocessed image 11 with camera shakes and the like may also be used if appropriate corrections are possible. For example, the shooting subjects may include a reference point so that this reference point can be utilized to correct camera movement if any. That is, the "same position" criterion for frame-to-frame comparison to be described later is not limited to the local coordinates intrinsic to each frame. The same position may be determined based on global coordinates on the subject side (based on the reference position on the subject side) in consideration of a relative shift between frames, the zooming of the image, and the like.

Figure 2:
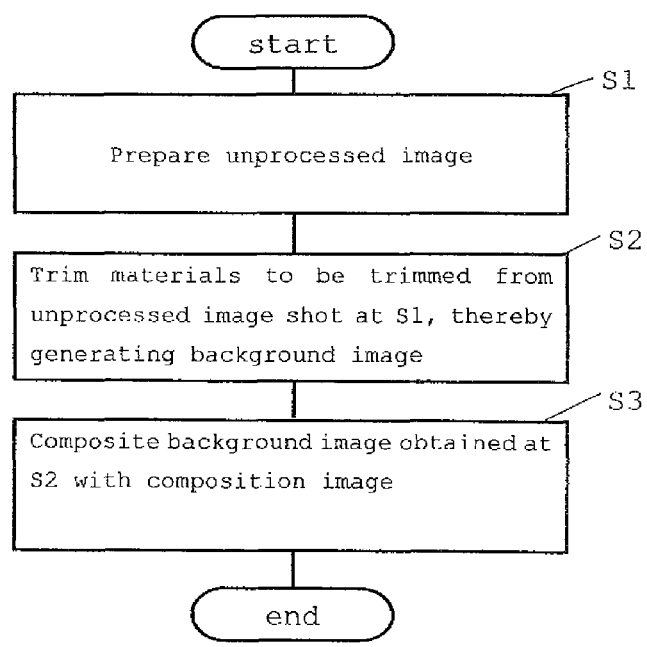
FIG. 2 is a flowchart showing the background image generation method.

FIG. 2 is a flowchart showing the comprehensive basic concept of the present embodiment.

For a preparation step, an unprocessed image 11 is initially prepared which is shot against an arbitrary background, including materials to be trimmed (S1). Next, the materials to be trimmed are trimmed from this unprocessed image 11, whereby a background image 12 is generated (S2). Subsequently, the background image 12 obtained through steps S1 and S2 is composited with a composition image 13 (S3). This completes a composited image.

Figure 3:
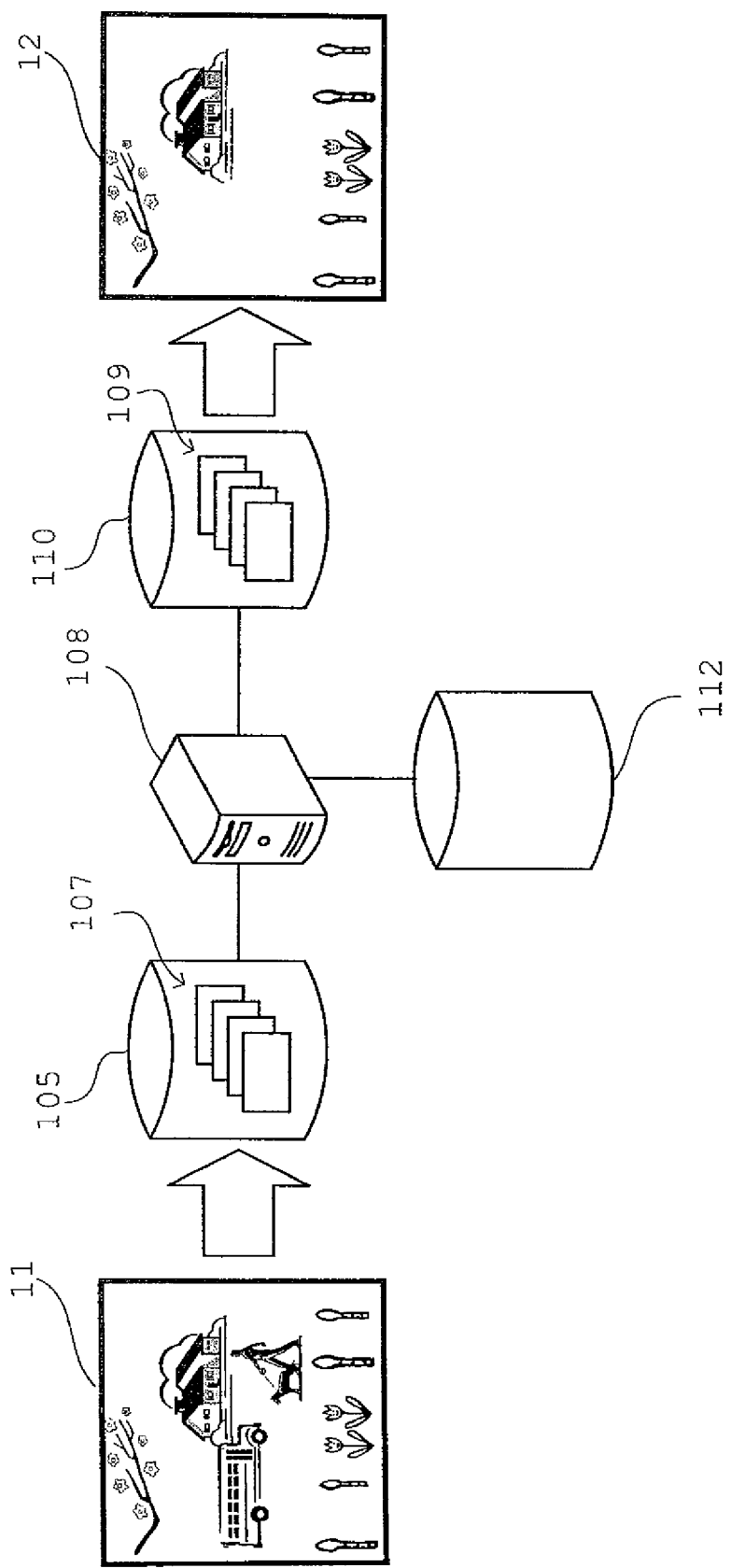
FIG. 3 is a block diagram showing the overall configuration of a background image generation system according to the present embodiment.

Next, a description will be given of a background image generation system according to the embodiment of the present invention. FIG. 3 is a schematic block diagram of this background image generation system 100.

In FIG. 3, the reference numeral 105 represents a hard disk (being preparation means) for storing the unprocessed image 11, and the reference numeral 107 represents frames that constitute part of the unprocessed image 11. The reference numeral 108 represents a computer which includes a CPU (Central Processing Unit), memory, communication bus, and a plurality of input/output interfaces, and the reference numeral 109 represents frames that are generated after the processing of this computer 108. The reference numeral 110 represents a hard disk (being composition image storing means) for storing these frames 109. The background image 12 is generated from these frames 109. Designated by the reference numeral 112 is a hard disk (being program storing means) which contains a program to be executed by this computer 108.

Figure 4:
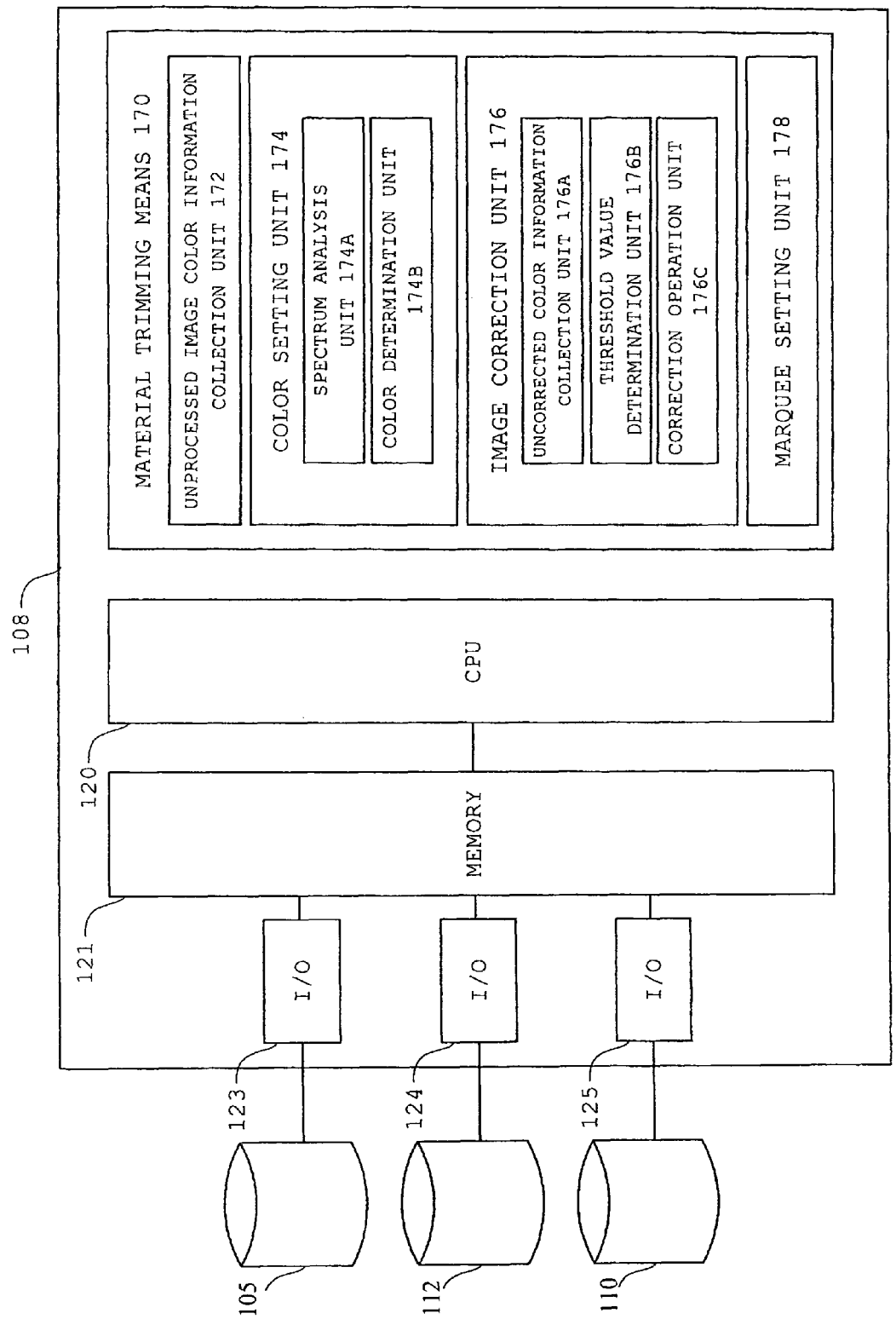
FIG. 4 is a block diagram showing the configuration of the computer in the background image generation system.

FIG. 4 is a diagram showing the internal configuration of the computer 108. It should be noted that this internal configuration also includes various functions that are obtained by storing the foregoing program once into a memory 121 of the computer 108, and running this program on a CPU (Central Processing Unit) 120.

The computer 108 includes the CPU 120, the memory 121, and input/output interfaces 123, 124, and 125 which are connected with the foregoing storing means 105, 110, and 112, respectively. There is also provided material trimming means 170 which is a functional configuration obtained by running the program on the CPU 120. The material trimming means 170 performs the processing of trimming the materials to be trimmed from the unprocessed image 11, thereby generating the background image 12. More specifically, this material trimming means 170 includes an unprocessed image color information collection unit 172, a color setting unit 174, an image correction unit 176, and a marquee setting unit 178.

Figure 5:
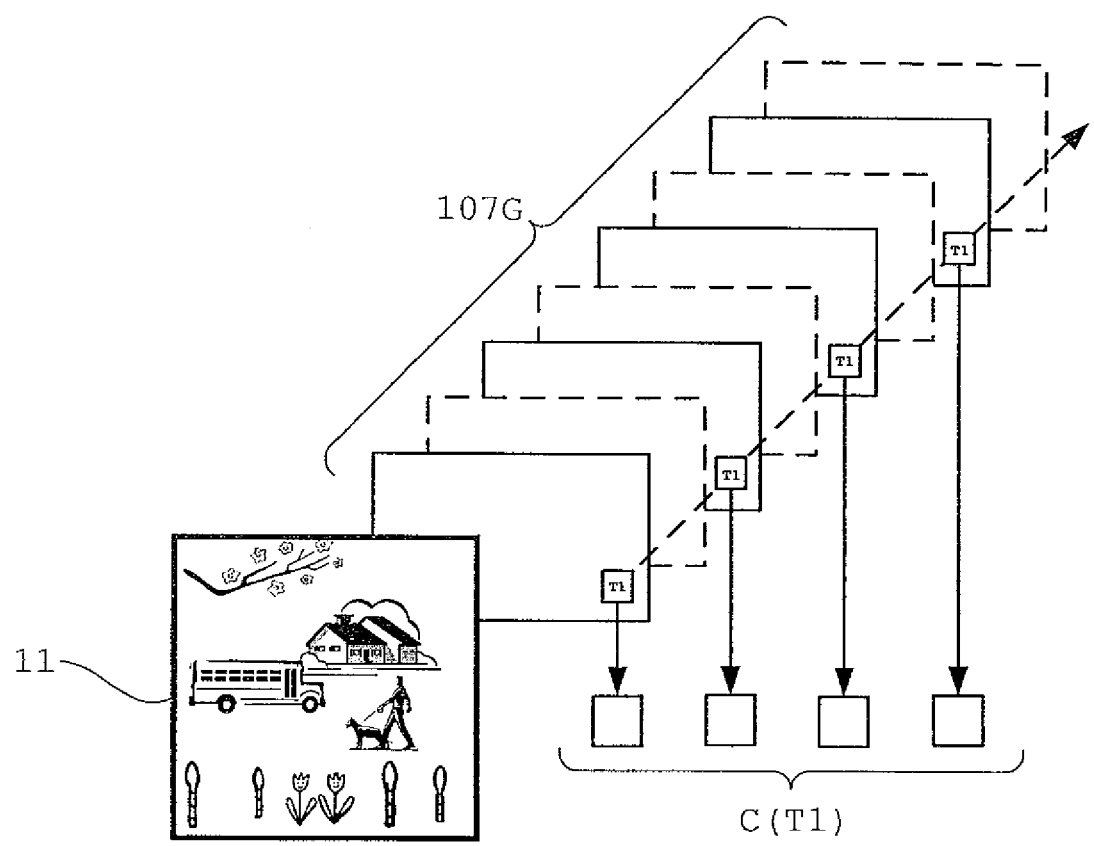
FIG. 5 is a diagram showing part of the procedure of trimming processing in the background image generation system.

The unprocessed image color information collection unit 172, as shown in FIG. 5, collects color information on a certain collection point T1 (here, a certain single pixel) from a group of frames 107G of the unprocessed image 11 along the time axis, thereby generating a color information set C(T1). Here, a plurality of frames 107 are selected from among all the frames 107 of the unprocessed image 11 at predetermined intervals, thereby constituting the group of frames 107G, from which the color information set C(T1) is acquired.

That is, prior to specific material trimming processing, the color information on the certain collection points T1 at the same coordinates of the unprocessed image 11 is collected in the direction of the time axis, whereby the color information is arranged in one dimension. Coordinate information on the collection points T1 is added to the entire set of one-dimensional color information, with a significant reduction in the amount of information. The amount of information is also reduced because the color information is collected not from all the frames 107 but at predetermined intervals. In the present embodiment, the collection point consists of a single pixel, whereas it may be composed of a plurality of adjoining pixels (for example, 8×8 pixels). While the collection point here consists of a pixel falling on the same local coordinates in each frame 107, the collection point may include a pixel or pixels that lie in the same position based on the global coordinates on the subject side (being an image side) (based on the reference position on the side of a certain subject) in consideration of the degree of scaling.

Figure 6:
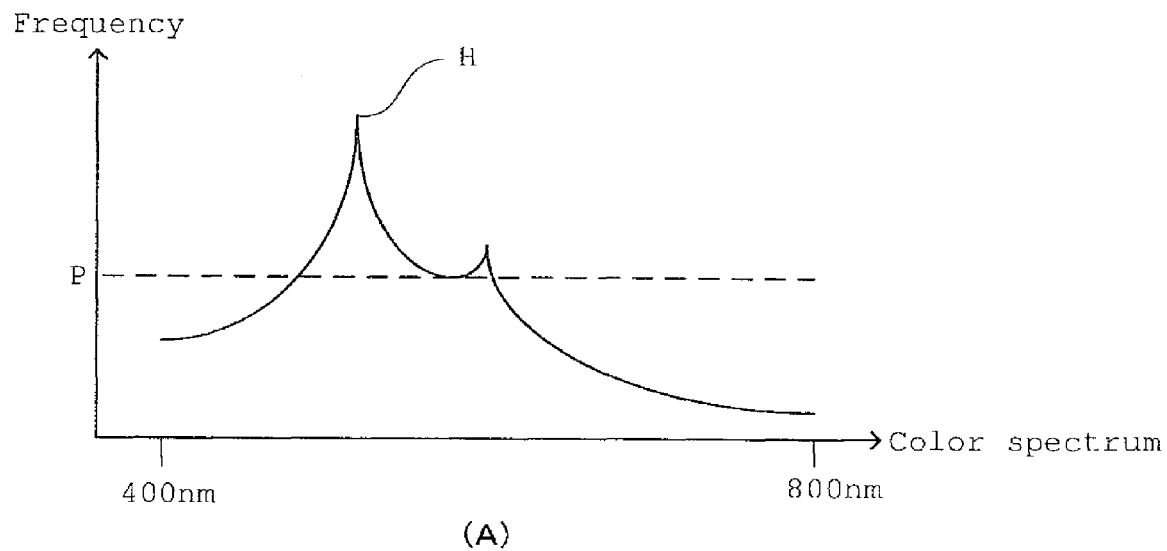
FIG. 6 is a graph showing examples of spectrum analysis in the trimming processing.
Figure 6:
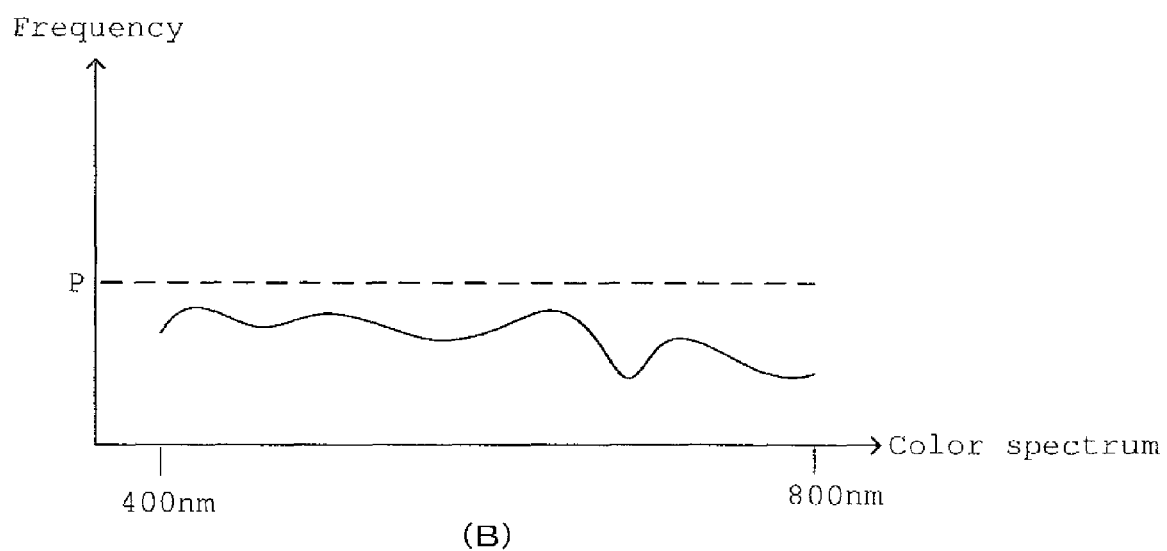

Returning to FIG. 4, the color setting unit 174 judges from the color information set C(T1) which color shows the background and which color shows the materials to be trimmed, thereby determining an optimum background-side color value. Specifically, a spectrum analysis unit 174A initially performs a spectrum analysis on the color information set C(T1) collected. Specifically, as shown in FIG. 6(A), a histogram showing the distribution of color information is created from the color information set C(T1), whereby the frequencies of occurrence in the color spectrum are calculated. In this histogram, the horizontal axis indicates the color value, and the vertical axis indicates the number of times (being the number of frames) the color value occurs. From this histogram, it is possible to determine the color value that occurs most frequently in the collection point (T1). The colors that show the materials to be trimmed, such as the passenger 5A and the bus 5B which cross in front of the background, are low in the frequency of occurrence. The color of the stationary background side is high in the frequency of occurrence. Using the result of this spectrum analysis, a color determination unit 174B determines the color of the highest frequency as the background-side color value H(T1).

Note that if the collected amount of the color information set C(T1) is small, the histogram may fail to provide an appropriate mode value as shown in FIG. 6(B). The reason for this is that there is not yet a sufficient difference between the amount of time for which the background shows in the unprocessed image 11 and the amount of time for which the materials to be trimmed appear, such as the passenger 5A and the bus 5B crossing in front. The color determination unit 174B then sets a judgment criterion P (such as an occupancy rate of 10% or above) as to the level or occupancy rate of the mode value in the color information set C(T1) collected. Unless the actual mode value exceeds this judgment criterion P, the color determination unit 174B determines that the collected amount of the color information set C(T1) is insufficient, and returns an error. This error is transferred to the unprocessed image color information collection unit 172. The unprocessed image color information collection unit 172 collects additional color information to regenerate the color information set (T1) on the collection point T1 that has resulted in the error, by shortening the collection intervals of the frames 107 or adding frames 107. The color setting unit 174 then performs a spectrum analysis on this color information set C(T1) again.

Note that while the present embodiment deals with the case of determining the background-side color value H by utilizing a color spectrum analysis, the background-side color value H may be determined, for example, based on an average color value of the color information set C. Moreover, while the foregoing description has dealt only with the collection point T1, the material trimming means 170 performs the determination of background-side color values H on the entire area where to extract the background from.

Returning to FIG. 4, the image correction unit 176 generates the background-side image 12 by using this background-side color value H. Here, an uncorrected color information collection unit 176A of the image correction unit 176 collects color information on all the frames of the unprocessed image 11 at the collection point (T1) corresponding to the background-side color value H(T1), thereby collecting an uncorrected color information set A(T1). If the unprocessed image color information collection unit 172 has collected the color values on all the frames, the color information set C(T1) may be simply used as the uncorrected color information set A(T1). Suppose that this collection point continues displaying the same thing throughout the image. The uncorrected color information set A(T1) then has a spectrum that is constant with time, tracing a horizontal line on a graph with the spectrum change on the vertical axis and the number of frames (lapse of time) on the horizontal axis. When an image other than the background appears in the collection point, the uncorrected color information set A(T1) varies greatly in spectrum. In reality, however, the uncorrected color information set A(T1) includes fluctuations of the sunlight itself and fluctuations due to the movements of the sun, clouds, and the like, aside from the background color and the colors of the materials to be trimmed. This results in small constant changes in color along the time axis as shown in FIG. 7(A), with large jumps on the graph when the materials to be trimmed suddenly appear.

The image correction unit 176 sets a judgment threshold color value with respect to each uncorrected color information set A(T1) based on the background-side color value H(T1). In the present embodiment, a threshold color value determination unit 176B of the image correction unit 176 determines an upper limit color value SH(T1) and a lower limit color value SL(T1) with a certain allowable range of variations K across the background-side color value H(T1). Moreover, a correction operation unit 176C of the image correction unit 176 extracts areas X where the uncorrected color information set A(T1) goes out of the upper limit color value SH(T1) or the lower limit color value SL(T1), and corrects the color information therein.

Figure 7:
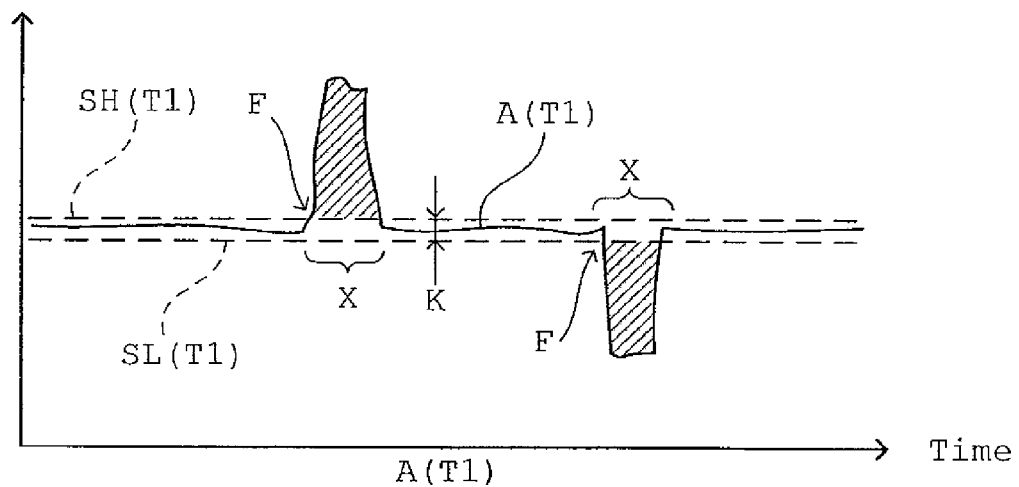
FIG. 7 is a graph showing an image correction operation in the trimming processing.
Figure 7:
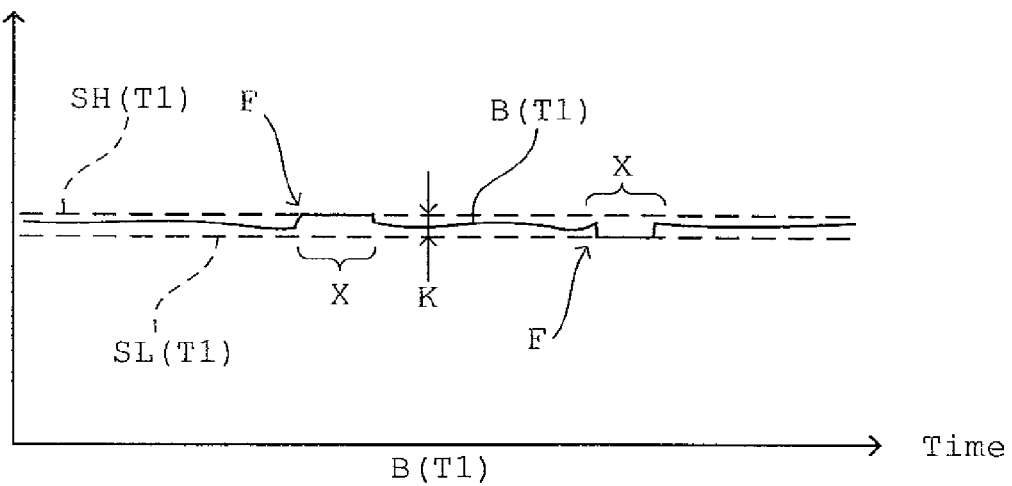

The correction operation unit 176C replaces the color information in these areas X falling outside the threshold color values, with color information F on the uncorrected color information set A(T1) near to immediately before the timing where the upper limit color value SH(T1) or the lower limit color value SL(T1) is stepped over, thereby outputting a corrected color information set B(T1) as shown in FIG. 7(B). This makes it possible to trim only the materials to be trimmed while leaving noise and small fluctuations of the sunlight, clouds, and the like. A natural image as if recording the background alone can thus be obtained, not as if being frozen completely. It should be appreciated that while the description has dealt with the case where the unprocessed image 11 is corrected in the collection point T1 alone, the correction of the correction color information sets A is performed on the entire area where to extract the background from, thereby outputting corrected color information sets B, which are composited to complete the background-side image 12.

Figure 8:
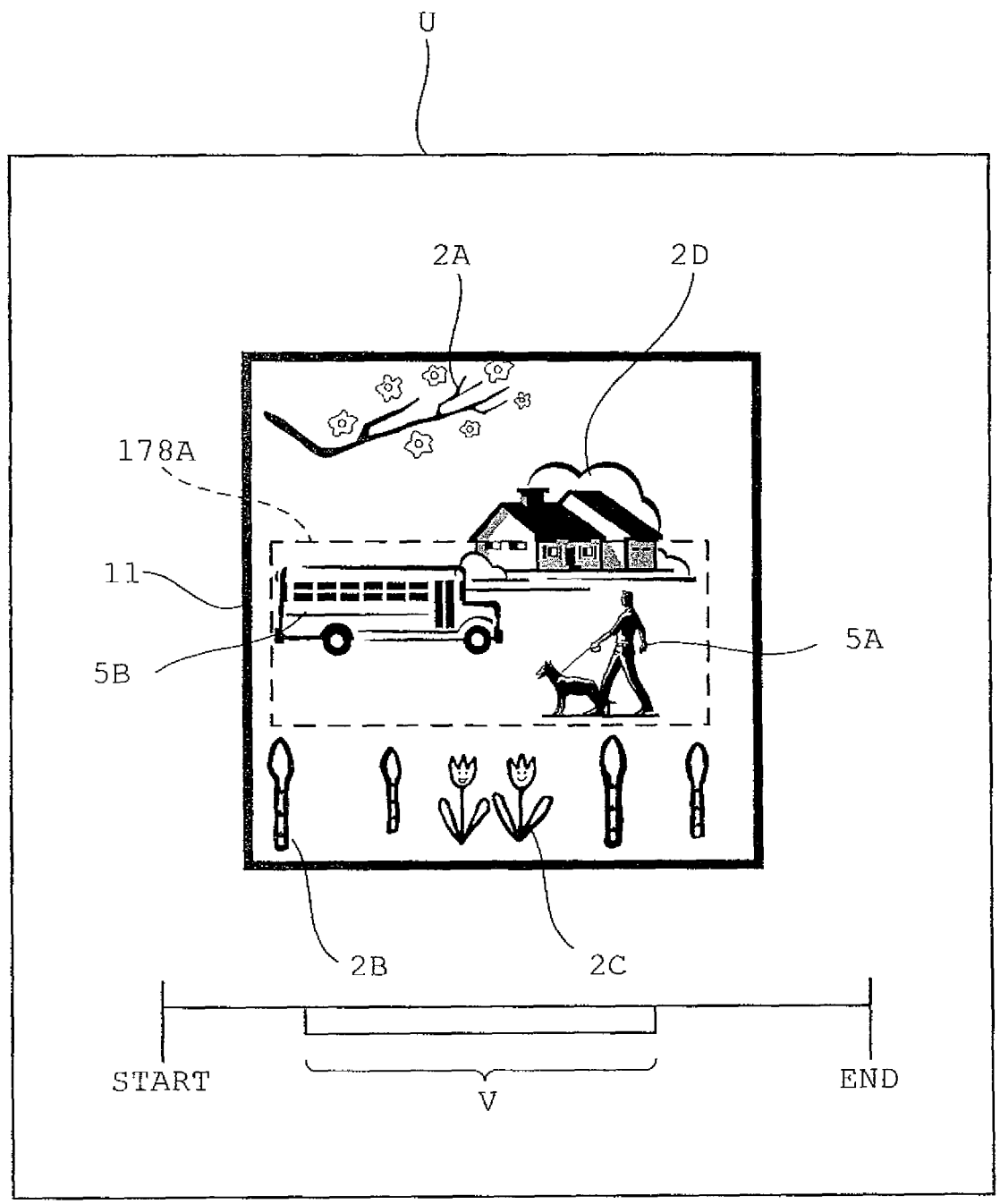
FIG. 8 is a diagram showing a user interface of the background image generation system.

Note that, as shown in FIG. 8, the marquee setting unit 178 displays a setting marquee 178A over the unprocessed image 11 on a user screen U of the background image generation system 100. This setting marquee 178A is used to prompt the user to set an area where to apply the processing for trimming the materials to be trimmed to. For example, if the materials to be trimmed such as the passenger 5A and the bus 5B appear not across the entire area of the unprocessed image 11 but are limited to some sub area, the trimming processing has only to be performed on that area. This area setting with the setting marquee 178A allows a significant reduction in the processing time. The omission of the trimming processing outside the setting marquee 178A also makes it possible to leave a natural image. In the present embodiment, the time axis is also displayed on the user screen so that a time span V can be set, in addition to the area setting by the marquee setting unit 178 using the setting marquee 178. This makes it possible to perform the trimming processing only in a certain time span V if the materials to be trimmed appear only in this certain time span V and not in the other time slots.

Next, a background-side image generation procedure of the background image generation system 100 will be described with reference to the flowchart of FIG. 9.

Initially, data is read from the hard disk 105, which contains an unprocessed image 11 shot by a camera, through the input/output interface 123 (S101). The data is stored into the memory 121 (S102), and transmitted to the CPU 120 (S103). Next, the program intended for the background image generation system, stored in the hard disk 112, is read through the input/output interface 124 (S104), stored into the memory 121 (S105), and transmitted to the CPU 120 (S106). This CPU 120 runs the program to perform material trimming processing, using the data on the unprocessed image 11 (S107). A background image 12 resulting from this processing is transmitted to the memory 121 (S108), and written to the hard disk 110 through the input/output interface 125 (S109).

Figure 9:
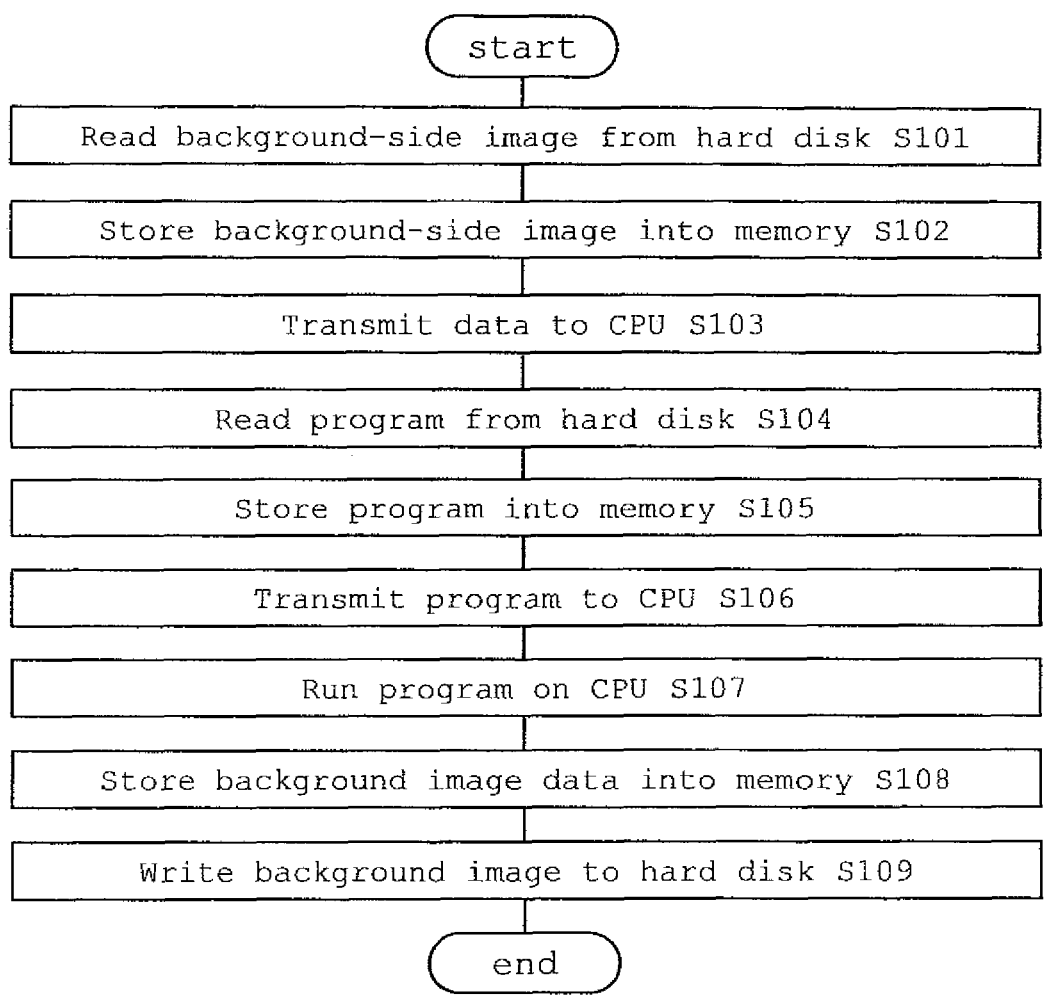
FIG. 9 is a flowchart showing the operation of the background image generation system.
Figure 10:
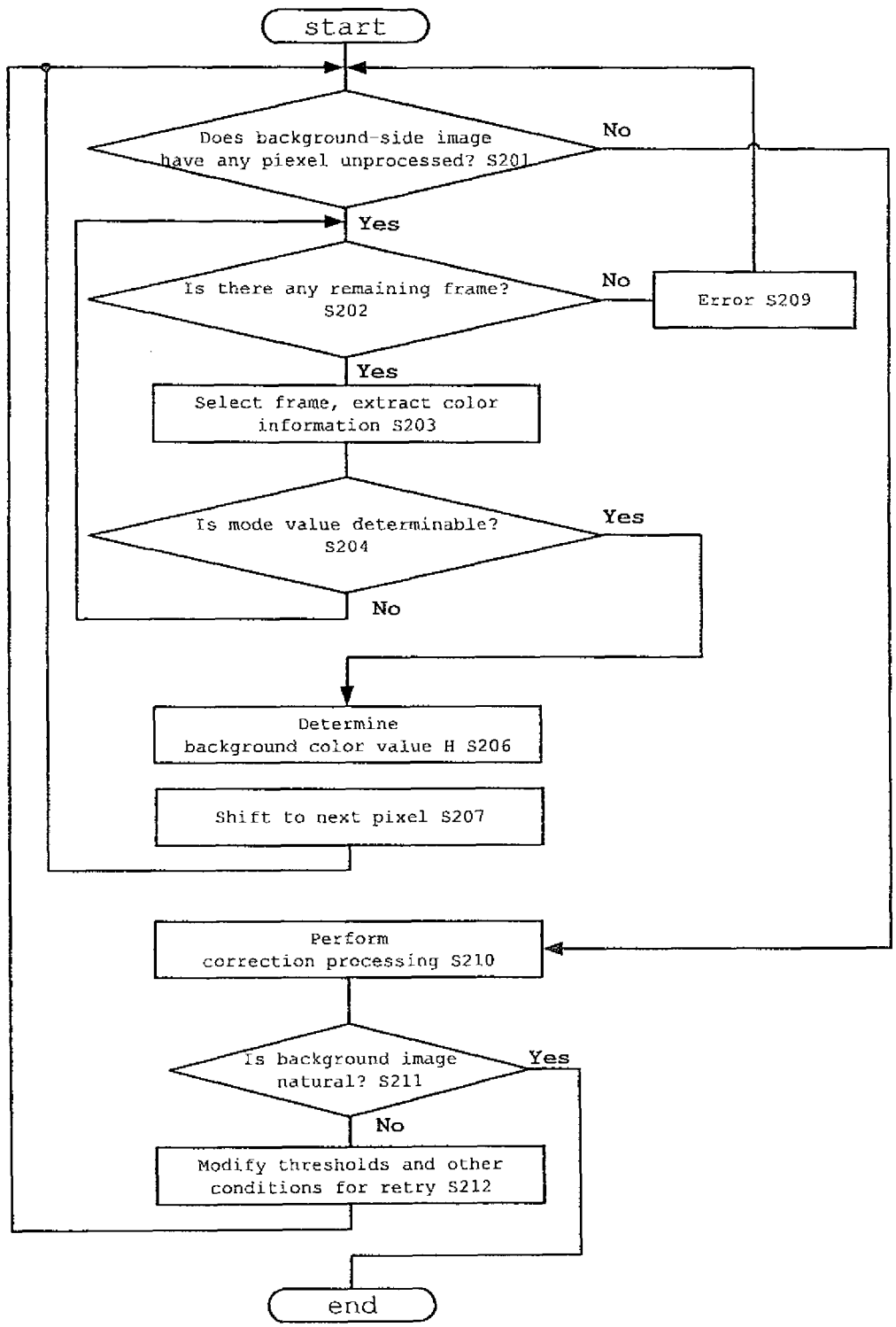
FIG. 10 is a flowchart showing the trimming processing of the background image generation system.

FIG. 10 is a flowchart showing the detailed procedure of the material trimming processing at step S107 in the flowchart of FIG. 9.

In the present embodiment, the unprocessed image 11 is processed in units of collection points lying at the same coordinates, or pixel by pixel in the case of the present embodiment in particular. At step S201, it is then checked if the unprocessed image 11 has any pixel (collection point) where the trimming processing is yet to be performed.

If there is any pixel where the material trimming processing is yet to be performed, the processing proceeds to step S202, in which the unprocessed image color information collection unit 172 determines whether or not the unprocessed image 11 has any uncollected (remaining) frame 107 as to the new one pixel (collection point). If there is any uncollected frame 107, color information on that frame 107 is collected and incorporated into the color information set C at step 203. It should be appreciated that for the first round of processing, color information on a minimum number of frames 107 of the unprocessed image 11 is incorporated into the color information set C. Subsequently, at step 204, the color setting unit 174 performs a spectrum analysis on this color information set C, and judges whether or not the occupancy rate of the spectrum mode value exceeds the determination criterion P. If the amount of information of the color information set C is too small to select the mode value (in the case of an error), the processing returns to step 202 for additional color information. A certain frame 107 is selected from among the remaining frames 107, and color information on this frame 107 is collected and added to the color information set C (S203). This selected frame 107 may be a frame 107 that adjoins to one of the collected frames 107, or a frame 107 lying at a certain interval from one of the collected frames 107 as mentioned previously. The foregoing is repeated to increase the amount of information of the color information set C successively. If a certain piece of color information that exceeds the judgment criterion can be selected from the spectrum analysis of step 204, then a background-side color value H is determined at step S206. Shifting to the next one pixel (collection point) (S207), a background-side color value H is then determined similarly through steps 201 to 206. If the background-side color value is still indeterminable from the spectrum analysis of step 204 when there is no remaining frame at step 201, the error of failing to determine the background-side color value H is output (S209). The processing then proceeds to the next pixel (S207).

The foregoing processing is repeated until the determination of the background-side color value H is completed with all the pixels in the area to be processed (S201). The flow proceeds to step 210, in which the image correction unit 176 performs correction processing on the image (to be detailed later). Subsequently, at step 211, the processed background image is checked whether natural or not. The processing ends when the check is completed. If the background image is unnatural, on the other hand, all the processing is performed again (S212).

Figure 11:
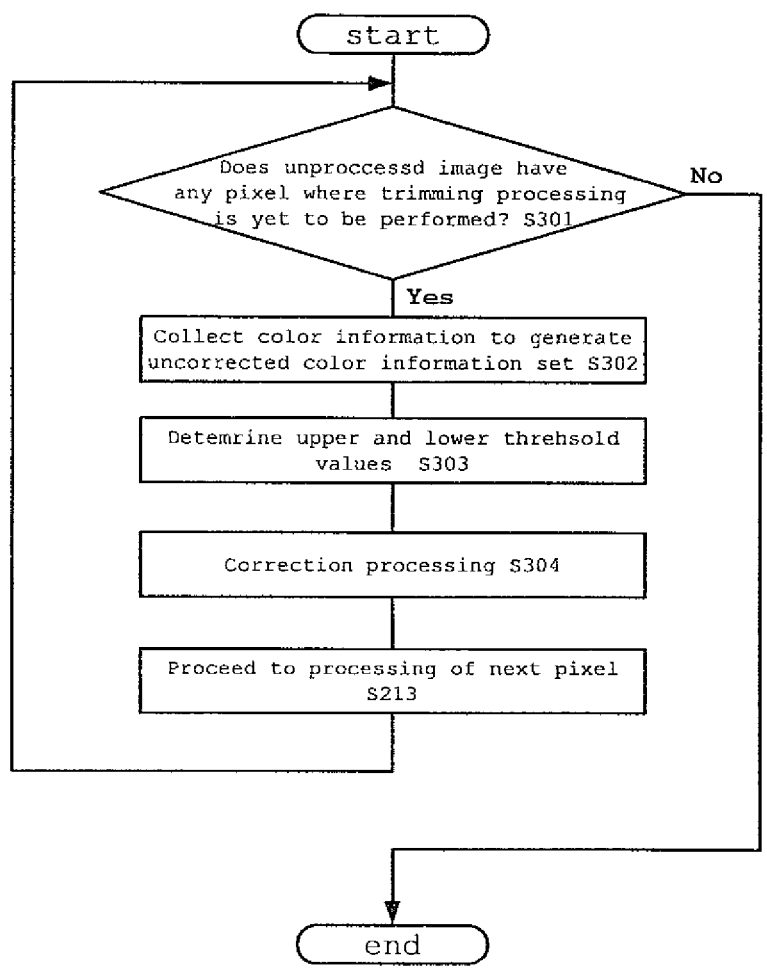
FIG. 11 is a flowchart showing the image correction operation of the background image generation system.

FIG. 11 is a flowchart showing a more detailed procedure of the correction processing at step S210 in the flowchart of FIG. 10.

In this correction processing, the unprocessed image 11 is processed in units of collection points lying at the same coordinates, or pixel by pixel in the case of the present embodiment in particular. At step S301, it is then checked if the unprocessed image 11 has any pixel (collection point) where the correction processing is yet to be performed.

If there is any pixel where the correction processing is yet to be performed, the flow proceeds to step S302. The uncorrected color information collection unit 176A collects color information on the new one pixel (collection point) from all the frames 107 of the unprocessed image 11, thereby generating an uncorrected color information set A. Next, the threshold color value determination unit 176B determines an upper limit color value SH and a lower limit color value SL by using the backgrounds-side color value H of this collection point (S303). At step 304, the correction operation unit 176C corrects the color information in portions where the uncorrected color information set A goes out of the upper limit color value SH and the lower limit color value SL, thereby generating a corrected color information set B. When the correction is completed, the flow shifts to the next pixel (S305) to repeat the same processing. If the background-side color values of all the pixels within the area to be processed are determined (S301), the correction processing is completed.

According to this background image generation system 100, the background image 12 is generated by judging differences in color between the background and the materials to be trimmed, utilizing time variations of the unprocessed image 11. To generate the background image 12, it is therefore only necessary to prepare the unprocessed image 11 which includes passengers and the like, without enforcing a traffic control downtown or building a dedicated studio. The color information set C is generated by collecting color information on a certain collection point from a plurality of frames 107, and temporal color variations of this color information set C are utilized to determine a background-side color value H. When compared to the cases of processing two- or three-dimensional color information directly, the color information set thus has an extremely small amount of information since a single piece of coordinate information on the collection point has only to be prepared for a single color information set. This allows a significant improvement in processing speed. With this color information set C as a unit, a plurality of color information sets C may also be distributed over a plurality of computers or CPUs to determine respective background-side color values H. The resultant can be finally collected to generate the background image 12 in a short time.

Note that while the present embodiment has dealt only with the case of performing the processing with a single pixel as a collection point, the processing may preferably be performed with a plurality of adjoining pixels as a collection point. For example, given a background that does not have much tone variations, such as a building and a park, collection points composed of a plurality of pixels can provide a background image 12 with stable color tones on the whole. The reduced number of collection points can further reduce the time necessary to determine background-side color values H and to perform image correction.

In the present embodiment, a plurality of frames 107 are selected from among all the frames 107 of the unprocessed image 11 at predetermined intervals to generate the color information set C, which is then utilized to obtain the background-side color value H. This also contributes to the reduced amount of information. When determining the background-side color value H, the color information set C is generated not by collecting color information on a large number of frames 107 from the beginning but by supplementing a lack of frames successively through the use of the result of spectrum analysis for determining the background-side color values H. This can minimize the amount of information of the color information set C.

This background image generation system 100 consults the frequencies of occurrence in the color spectrum of the color information set C, and determines the mode value as the background-side color value H. This can increase the possibility for this background-side color value H to be the actual background color, thereby reducing errors in selecting color. In particular, the present embodiment prepares a judgment criterion in advance so that the mode value of the color spectrum of the color information set C can be set as the background-side color value H only if it exceeds the judgment criterion. This consequently prevents the background-side color value H from being erroneously determined due to a lack of information, making it possible to determine the background-side color value H with high reliability.

It should be understood that this background image generation system 100 can use this background-side color value H directly to provide the background-side image in the form of a still image. Basically, a still image will suffice for the background-side image. In the present embodiment, however, a judgment threshold color value is also provided based on the background-side color value H so that the unprocessed image is corrected in portions where this judgment threshold color value is exceeded. The image is thus left intact in the portions where the judgment threshold color value is not exceeded. This makes it possible, for example, to faithfully express such scenery that is slightly dimming because of the movement of clouds or that is gradually deepening in the red of the sunset glow. Note that, in order to preserve a lot of image fluctuations, this judgment threshold color value is set to have a greater difference from the background-side color value H. In order to suppress fluctuations, it is set to have a smaller difference. Note that in the portions where this judgment threshold color value is exceeded, the image may be corrected by using the background-side color value H directly or by using the judgment threshold color value itself. In order to smoothen the image further, the image may preferably be corrected in the portions where the judgment threshold color value is exceeded, by extracting color information near to immediately before or near to immediately after the timing when the judgment threshold color value is exceeded.

In the present embodiment, the marquee information for determining the area to extract the background from is generated with respect to the unprocessed image 11. This makes it possible to leave the images on the entire screen side (such as passengers and cars) intentionally in the areas other than that of the marquee information. This can produce a background image 12 in which the materials to be trimmed of the unprocessed image 11 are trimmed in part.

Although not shown in the present embodiment, the color information set collected in the direction of the time axis may preferably be normalized. This clarifies the correction criteria in the correction unit, so that the background image can be generated appropriately. Unnecessary noise and the like can also be removed appropriately.

The present embodiment has also dealt with the case where collection points are defined in the same positions with reference to the local coordinates in the respective frames. The present invention is not limited thereto, however. For example, the collection points may be located in the same positions in consideration of a relative shift between frames due to camera shakes and the like, and the zooming of the image. Specifically, the present invention also covers the cases where the arrangement of pixels in each frame is defined with respect to the global coordinates on the subject side (with respect to a reference position on the subject side) so that the collection points of the same arrangement are compared with each other.

The present embodiment has also dealt with the case where the background image generated is composited with a background insert image which is shot separately. The present invention is not limited thereto, however. The background image may be used alone, and may be composited with computer graphics.

The background image generation system 100 of the present embodiment has also dealt with the case where a plurality of hard disks and input/output interfaces are used to store the unprocessed image, the background image, the program and the like separately. The present invention is not limited thereto, however. Common memory means may of course be used for collective storage.

The invention claimed is:

1. A method for generating a background image comprising:
   a preparation step of preparing an unprocessed image which is shot against an arbitrary background, including material to be trimmed;
   a color information collection step of collecting color values from a plurality of frames of the unprocessed image at a collection point composed of one or more pixels, thereby obtaining a color information set; and
   a color setting step of judging from the color information set which color shows the background and which color shows the material to be trimmed, and determining an optimum background-side color value, and wherein
   the color information collection step and the color setting step are applied to an area where to extract the background from, thereby obtaining a background image into which the background is extracted; further comprising
   selecting a part of all frames from the unprocessed image, and obtaining the color information set therefrom in the color information collection step on the first round; and
   returning to the color information collection step to acquire the color information set again from an increased number of frames is repeated until the background-side color value is determinable when the background-side color value is indeterminable in the color setting step.

2. The method for generating a background image according to claim 1, wherein the collection point is composed of a plurality of pixels including one certain pixel and an adjacent pixel adjoining to the one certain pixel.

3. The method for generating a background image according to claim 1, wherein the color information collection step includes selecting a plurality of frames from all frames of the unprocessed image at predetermined intervals, and obtaining the color information set therefrom.

4. The method for generating a background image according to claim 1, wherein the color setting step includes determining the background-side color value based on a frequency of occurrence in a color spectrum of the color information set.

5. The method for generating a background image according to claim 4, wherein the color setting step includes determining a mode value of the color spectrum of the color information set as the background-side color value.

6. The method for generating a background image according to claim 4, wherein the color setting step includes preparing a judgment criterion in advance, and judging the background-side color value is determinable when a mode value of the color spectrum of the color information set exceeds the judgment criterion.

7. The method for generating a background image according to claim 1, wherein the color setting step includes determining the background-side color value based on an average color value of the color information set.

8. The method for generating a background image according to claim 1, wherein the background image into which the background is extracted is obtained by setting a judgment threshold color value based on the background-side color value, and correcting the unprocessed image in a portion where the judgment threshold color value is exceeded.

9. The method for generating a background image according to claim 8, wherein the image is corrected in the portion where the judgment threshold color value is exceeded, by using color information on the frame of the unprocessed image near to immediately before the frame in the timing when the judgment threshold color value is exceeded.

10. The method for generating a background image according to claim 8, wherein a judgment upper limit color value and a judgment lower limit color value are set as the judgment threshold color value, and the unprocessed image is corrected in a portion where the judgment upper limit value is exceeded or where the judgment lower limit value is not reached.

11. The method for generating a background image according to claim 1, comprising a marquee setting step of generating marquee information for determining the area where to extract the background from with respect to the unprocessed image.

12. A system for generating a background image, comprising:
preparation means for storing an unprocessed image into storing means, the unprocessed image being shot against an arbitrary background, including a material to be trimmed;
color information collection means for collecting color values from a plurality of frames of the unprocessed image at a collection point composed of one or more pixels, thereby generating a color information set; and
color setting means for judging from the color information set which color shows the background and which color shows the material to be trimmed, and determining an optimum background-side color value, and wherein
the color information collection means and the color setting means determine the background-side color value on an area where to extract the background from, thereby obtaining a background image into which the background is extracted;
the color information collection means selects a part of all frames from the unprocessed image, and obtains the color information set therefrom on the first round; and
the color information collection means repeats the acquisition of the color information set again from an increased number of frames until the background-side color value is determinable when the background-side color value is indeterminable by the color setting means.

13. The system for generating a background image according to claim 12, wherein the collection point in the color information collection means is composed of a plurality of pixels including one certain pixel and an adjacent pixel adjoining to the one certain pixel.

14. The system for generating a background image according to claim 12, wherein the color information collection means selects a plurality of frames from all frames of the unprocessed image at predetermined intervals, and obtains the color information set therefrom.

15. The system for generating a background image according to claim 12, wherein the color setting means determines the background-side color value based on a frequency of occurrence in a color spectrum of the color information set.

16. The system for generating a background image according to claim 15, wherein the color setting means determines a mode value of the color spectrum of the color information set as the background-side color value.

17. The system for generating a background image according to claim 15, wherein the color setting means prepares a judgment criterion in advance, and judges the background-side color value is determinable when a mode value of the color spectrum of the color information set exceeds the judgment criterion.

18. The system for generating a background image according to claim 12, wherein the color setting means determines the background-side color value based on an average color value of the color information set.

19. The system for generating a background image according to claim 12, comprising correction operation means for setting a judgment threshold color value based on the background-side color value, and correcting the unprocessed image in a portion where the judgment threshold color value is exceeded, thereby obtaining the background image into which the background is extracted.

20. The system for generating a background image according to claim 19, wherein the correction operation means corrects the image in the portion where the judgment threshold color value is exceeded, by using color information on the frame of the unprocessed image near to immediately before the frame in the timing when the judgment threshold color value is exceeded.

21. The system for generating a background image according to claim 19, wherein the correction operation means sets a judgment upper limit color value and a judgment lower limit color value as the judgment threshold color value, and corrects the unprocessed image in a portion where the judgment upper limit value is exceeded or where the judgment lower limit value is not reached.

22. The system for generating a background image according to claim 12, comprising marquee setting means for generating marquee information for determining the area where to extract the background from with respect to the unprocessed image.

* * * * *